United States Patent [19]

Totten

[11] Patent Number: 5,477,883

[45] Date of Patent: Dec. 26, 1995

[54] SELF-SEALING BAG VALVE

[75] Inventor: Kevin J. Totten, South Elgin, Ill.

[73] Assignee: The Coca-Cola Company, Atlanta, Ga.

[21] Appl. No.: 339,722

[22] Filed: Nov. 14, 1994

[51] Int. Cl.[6] ................................................. F16L 37/28
[52] U.S. Cl. .................... 137/614.03; 251/149.6; 251/902
[58] Field of Search .................... 137/614.03, 614.05; 251/149.6, 902

[56] References Cited

U.S. PATENT DOCUMENTS

| | | | |
|---|---|---|---|
| 4,421,296 | 12/1983 | Stephens | 251/149.6 |
| 4,445,539 | 5/1984 | Credle . | |
| 4,564,132 | 1/1986 | Lloyd-Davies . | |
| 4,948,014 | 8/1990 | Rutter et al. | 251/149.6 |
| 5,031,662 | 7/1991 | Roethel | 137/614.03 |
| 5,255,713 | 10/1993 | Scholle . | |
| 5,390,898 | 2/1995 | Smedley et al. | 251/149.6 |

Primary Examiner—A. Michael Chambers
Attorney, Agent, or Firm—Birch, Stewart, Kolasch & Birch

[57] ABSTRACT

A self-sealing bag valve for use with a quick-disconnect coupling in a bag-in-box (BIB) syrup dispensing assembly for a post-mix beverage dispenser includes a plastic spring assembly for normally biasing a poppet of a self-sealing valve into sealing engagement with a valve seat thereof. The spring assembly includes a petaloid-shaped disc having evenly spaced petaloid segments defining flow passages therebetween, a retaining ring for securing peripheral portions of the petaloid-shaped disc in fixed positions in the bore of the self-sealing valve and a petaloid stem protruding from the disc into engagement with the valve poppet. The petaloid-shaped disc includes a first frusto-conical portion extending from the retaining ring to a circular termination line concentric with the ring and a second frusto-conical portion extending from the circular termination line to the petaloid stem. The first and second frusto-conical portions, when in an installed, normal biasing position (the closed position of the self-sealing valve), have opposite slopes with respect to an axis orthogonal to the petaloid disc providing a bend about the circular termination lines forming knees in each petaloid segment for accommodating flexing of the elements about the knees. A groove is provided in the central bore of the valve housing for accommodating a snap-fit of the retaining ring therein.

12 Claims, 8 Drawing Sheets

SELF-SEALING BAG VALVE

BACKGROUND OF THE INVENTION

The present invention relates to a self-sealing valve assembly for use with a quick-disconnect coupling in a bag-in-box (BIB) syrup dispensing assembly of a post-mix beverage dispenser. More specifically, the present invention relates to an improved biasing spring for the valve poppet of the self-sealing valve disposed in the bag fitment of a collapsible bag.

A typical self-sealing valve disposed in the fitment of a collapsible bag for use in a BIB dispensing system is disclosed in U.S. Pat. No. 4,445,539 to Credle issued May 1, 1984. As described in that patent a quick-disconnect coupling 72 is operatively associated with a self-sealing valve 60 such that when the valves 72 and 60 are coupled together the respective valve poppets of the valves open to permit the flow of syrup through the associated valves to the beverage dispenser pump. The Credle patent discloses various forms of biasing springs for the valve poppet of the self-sealing valve fabricated from plastic including serpentine springs, bellows springs etc.

Other types of plastic springs are known in the art for such a self-sealing valve including spaced leaf springs, coil springs etc. The use of a metal coil spring is also known in the art.

Because of the high usage of the self-sealing valves in connection with the quick disconnect coupling it is desirable that the bag valve be recyclable. The performance of the prior art metal springs is satisfactory. However, a need in the art exists for a plastic spring.

SUMMARY OF THE INVENTION

Accordingly, it is a primary object of the present invention to provide a more durable plastic spring assembly for a self-sealing valve to be used in conjunction with a BIB beverage dispensing system which can deliver sufficient biasing force to effectively seal the valve when the quick-disconnect coupling is removed.

It is another object of the present invention to provide a plastic spring assembly for a self-sealing valve which may be injection molded in an inexpensive way.

The objects of the present invention are fulfilled by providing a self-sealing valve comprising:

a housing having first and second open ends connected by a central bore;

a valve seat disposed within said central bore;

a valve poppet movable into or out of sealing engagement with said valve seat to close or open the valve; and spring means for normally biasing said poppet into sealing engagement with said valve seat including, a petaloid-shaped disc having spaced petaloid segments defining flow passages therebetween, a retaining ring for securing peripheral portions of said disc in fixed positions in said bore, and a petaloid stem protruding from said disc into engagement with said valve poppet;

whereby movement of said poppet causes flexing of said petaloid segments.

The petaloid-shaped disc in a preferred embodiment includes a first frusto-conical portion extending from the retaining ring to a circular termination line concentric with the ring and a second frusto-conical portion extending from the circular termination line to the petaloid stem, said first and second frusto-conical portions, when in an installed, normal biasing position (the closed position of the self-sealing valve), having opposite slopes with respect to an axis orthogonal to the disc providing a bend about the circular termination line forming knees in each petaloid segment for accommodating flexing of the elements about the knees. A groove is provided in the central bore of the valve housing for accommodating a snap-fit of the retaining ring therein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
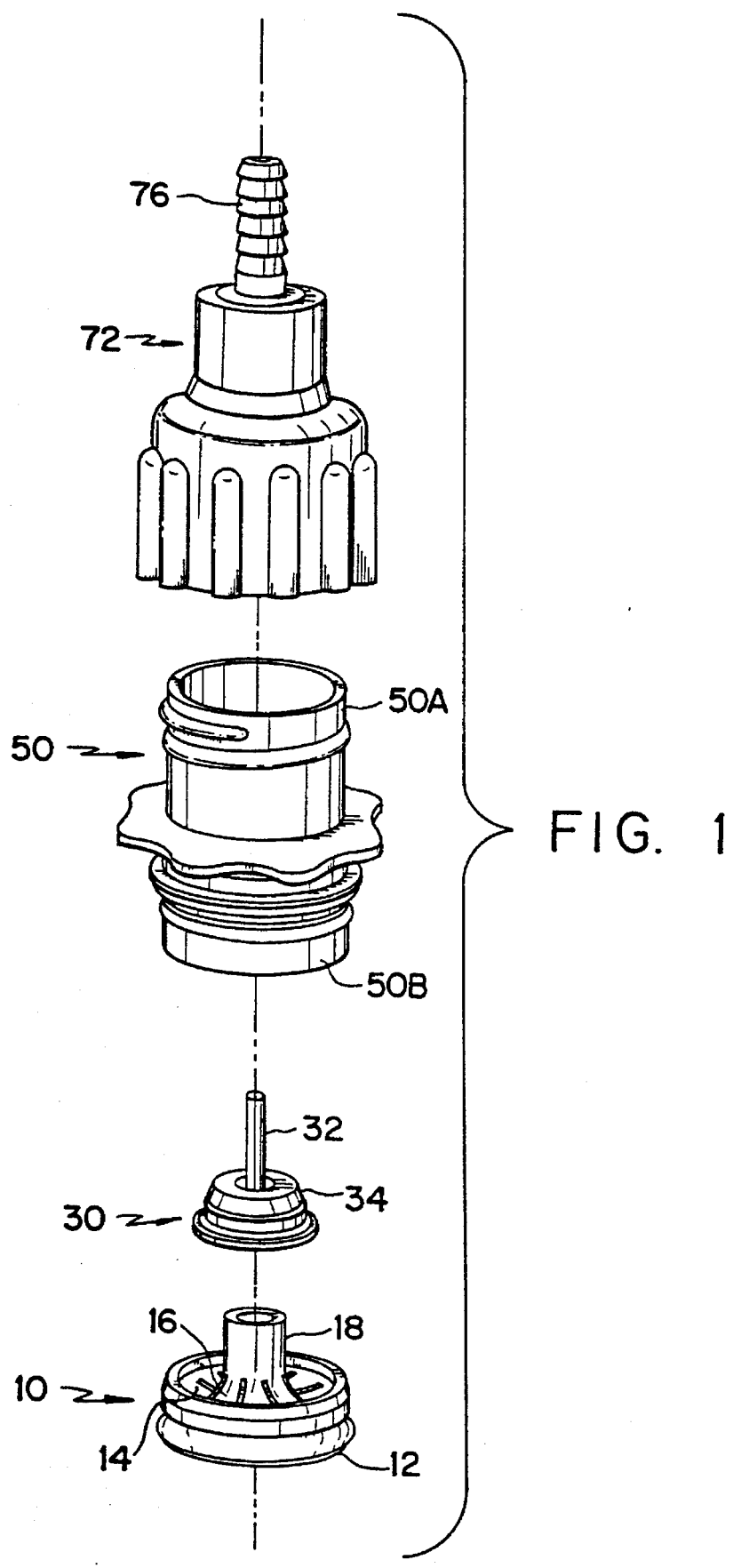
FIG. 1 is an exploded view illustrating the combination of a quick-disconnect coupling member, a self-sealing valve housing, a poppet and spring assembly of the present invention.

Referring in detail to the exploded view of FIG. 1 there is illustrated a bag valve 49, quick-disconnect coupling 72, a self-sealing bag valve housing 50, a valve poppet 30 and a biasing spring 10. Quick disconnect coupling 72 is screwable onto threaded socket 50A of housing 50 and poppet 30 and spring 10 are installed into valve housing 50 through the bottom end socket 50B in juxtaposed relationship. The bag valve assembly is then insertable into a spout, or fitment, 51 as illustrated in FIG. 10.

Figure 10:
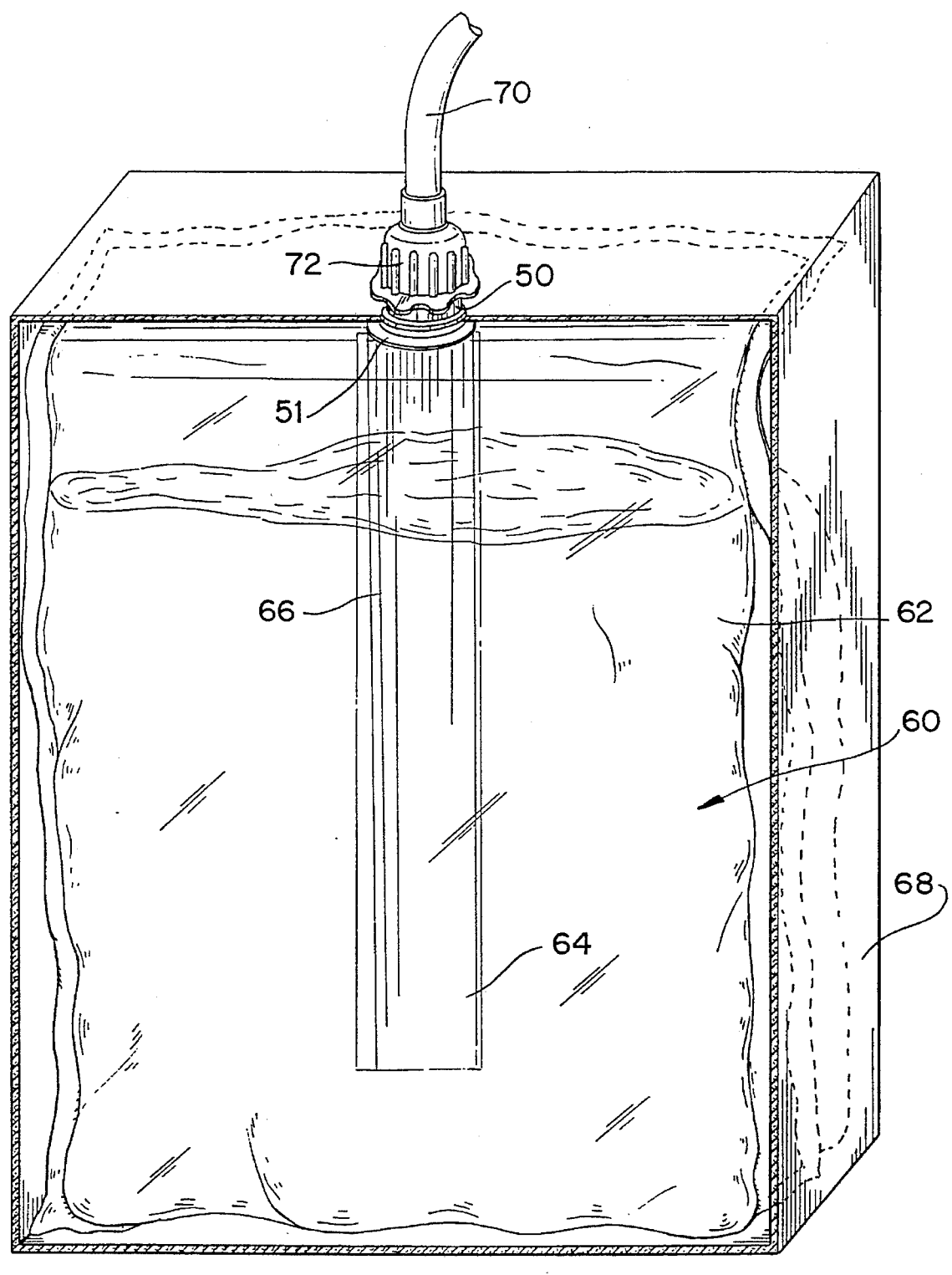
FIG. 10 is a side elevational view of a collapsible bag, associated fitment into which the self-sealing valve housing of FIG. 3A is inserted and surrounding box forming a bag-in-box assembly of a beverage dispensing system.

Referring to FIG. 10 there is illustrated a collapsible bag 60 filled with syrup, or flavor concentrate, 62, a dip strip 64 having longitudinal channels 66 for withdrawing syrup 62 from the bag 60 and a corrugated box 68 surrounding bag 60. The combined box 68 and bag 60 constitute what is known in the art as a bag-in-box (BIB) package for use in supplying syrup to a post-mix beverage dispenser. A hose 70 is connected to the quick disconnect coupling 72. A distal end of hose 70 is connected to a syrup pump from which the syrup is fed to a postmix dispenser.

Figure 2:
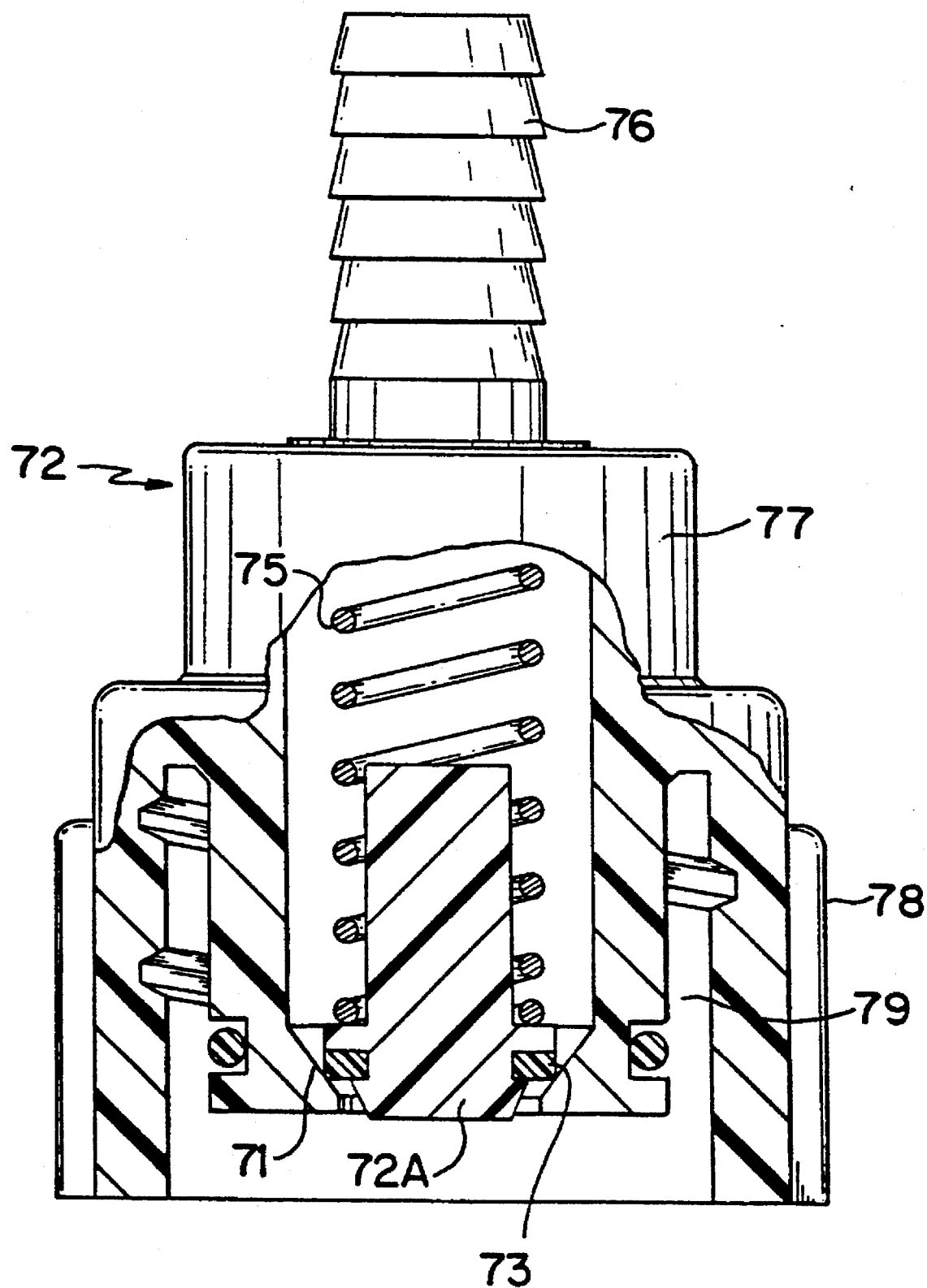
FIG. 2 is a cross-sectional view of the quick-disconnect coupling of FIG. 1.

Referring to FIG. 2, which is a cross-sectional view of quick-disconnect coupling 72, it can be seen that this coupling includes a spring-loaded valve poppet 72A, biased into the normally closed position illustrated, by a coil spring 75 so that gasket 73 seals against the tapered walls 71 of a flow-through cavity within the housing 77. Thus, in the position shown in FIG. 2 valve poppet 72A is closed and no syrup can flow out of the hose 70. As will be described more fully hereinafter with reference to FIG. 7 poppet 72A will open against the force of coil spring 75 in response to the interconnection of quick-disconnect coupling 72 and the bag valve 49. Coupling 72 includes an annular cavity 79 with cooperating threads for receiving the top socket 50A of valve housing 50. Coupling 72 is manually screwed thereto with the assistance of a plurality of spaced ribs 78 about the periphery of the coupling.

Figure 8:
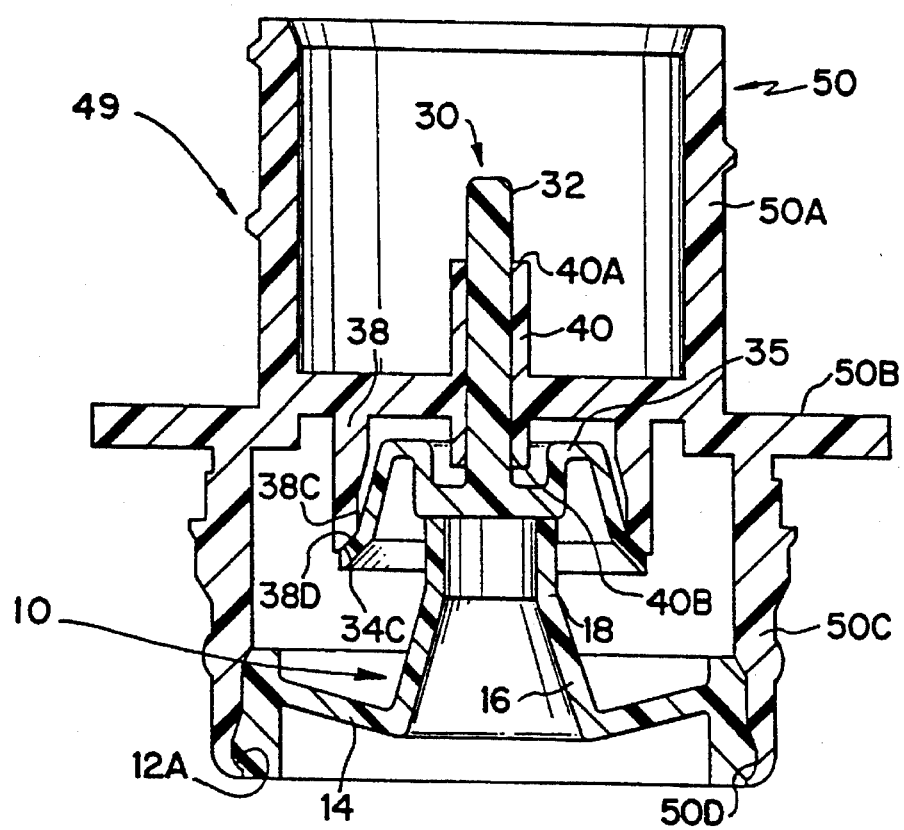
FIG. 8 is a cross-sectional view illustrating another embodiment of cooperating poppet and associated valve seat shapes of the self-sealing valve.

Referring to FIG. 8, the bag valve 49 of the present invention comprises a valve housing 50, a poppet 30 and a spring 10. Each of these components will now be described in detail.

Figure 3A:
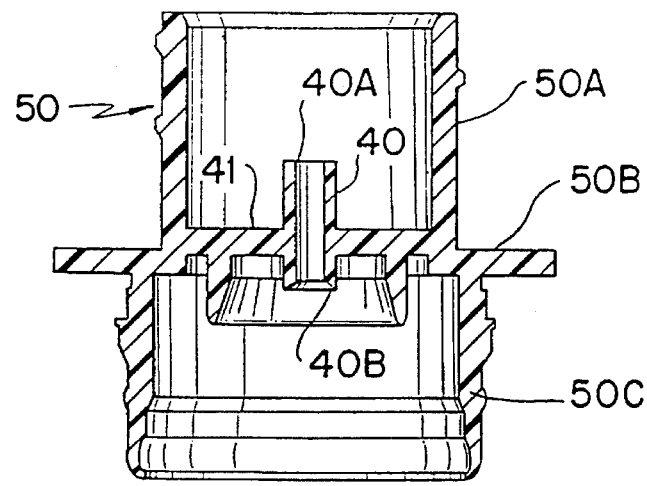
FIG. 3A is a cross-sectional view of the self-sealing valve housing of FIG. 1.
Figure 3B:
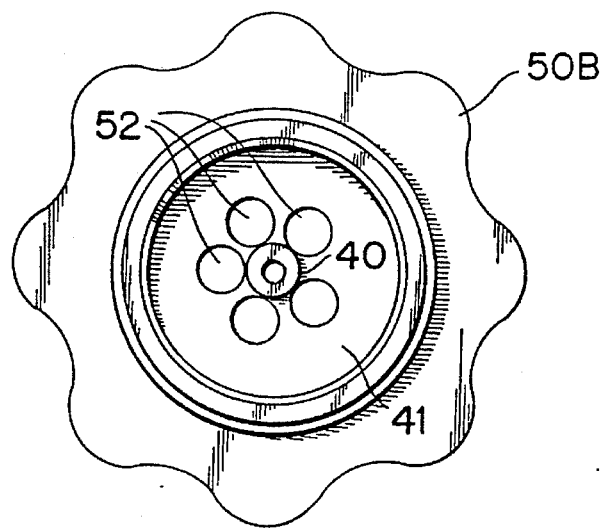
FIG. 3B is a top plan view of the valve housing of FIG. 3A.
Figure 3C:
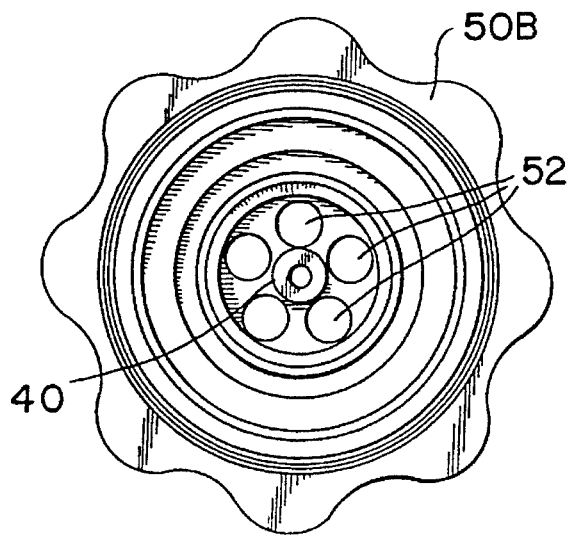
FIG. 3C is a bottom plan view of the valve housing of FIG. 3A.

Details of self-sealing valve housing 50 are illustrated in FIGS. 3A to 3C. Valve housing 50 includes a top portion 50A defining a first open end and including appropriate threads from on the periphery thereof for receiving mating threads within cavity 79 of quick-disconnect coupling 72. A peripheral flange 50B is disposed at about the midpoint of housing 50 for providing a stop or seating surface for the bottom of quick-disconnect coupling 72 when it is fully coupled to housing 50 (see FIG. 7). The bottom socket 50C of housing 50 defines a second Open end and includes peripheral, external threads for mating with associated internal threads in a bag spout or fitment 51 (see FIG. 10).

The first and second open ends of valve housing 50 are connected by a central bore for accommodating the flow of fluid therethrough, and wall 41 with fluid flow passages 52 therethrough is disposed at about the midpoint of the longitudinal axis of the bore. A cylindrical valve actuating stem 40 having a top end 40A and a bottom end 40B is integrally formed on wall 41 in the center of the bore. The central bore within cylindrical actuating stem 40 is operatively associated with the stem 32 of a valve poppet 30 to be described more fully hereinafter. The top end 40A of cylindrical stem 40 is positioned to engage the bottom end of valve poppet 72A of quick-disconnect coupling 72 (see FIG. 7).

Figure 4A:
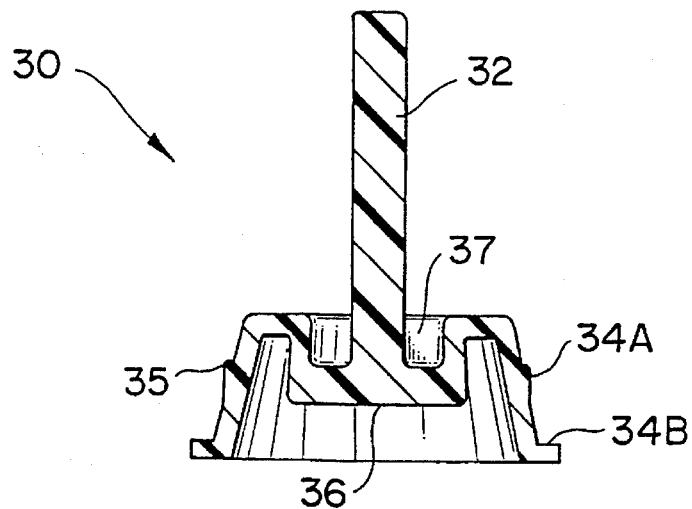
FIG. 4A is a front elevational view of the poppet for the self-sealing valve of the present invention.
Figure 4B:
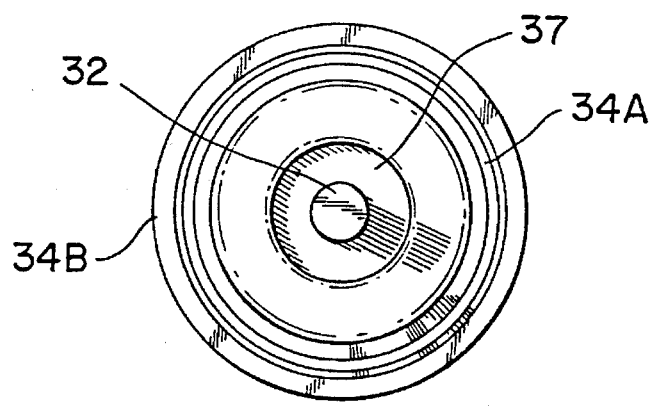
FIG. 4B is a top plan view of the poppet of FIG. 4A.
Figure 4C:
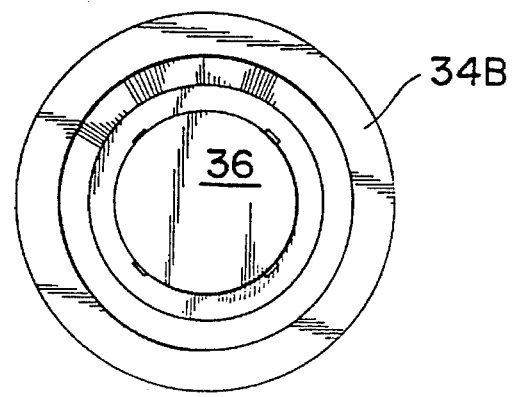
FIG. 4C is a bottom plan view of the poppet of FIG. 4A.

Details of the valve poppet 30 of the self-sealing valve of the present invention are illustrated in FIGS. 4A to 4C. As illustrated valve poppet 30 includes a valve actuating stem 32 extending from a frusto-conical base 35. An annular recess 37 is provided in the top of base 35 surrounding stem 32. A sealing shoulder 34A and sealing flange 34B are provided on the periphery of the base 35. The functional aspects of the structure of the valve poppet 30 will be more fully described in connection with FIG. 7.

Figure 5A:
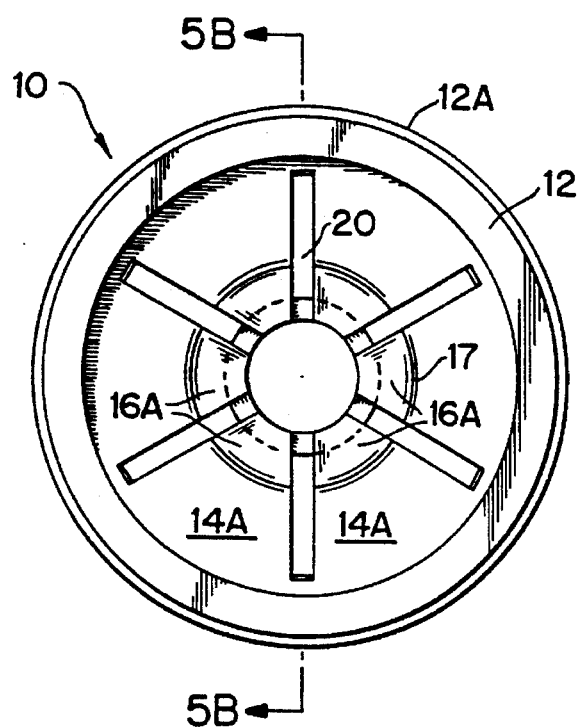
FIG. 5A is a top plan view of the spring of the present invention for use in the self-sealing valve.
Figure 5B:
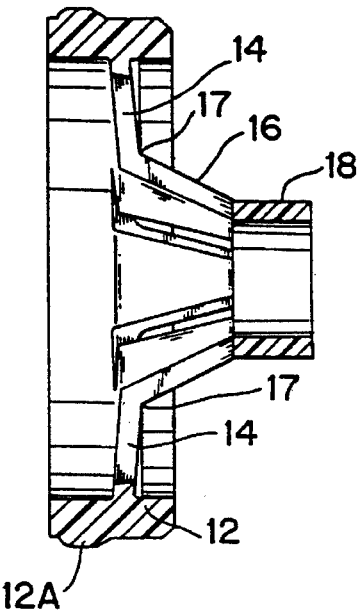
FIG. 5B is a cross-sectional view taken along line 5B—5B of FIG. 5A.

The plastic biasing spring assembly of the present invention is illustrated in FIGS. 5A and 5B. The spring assembly is generally designated 10 and includes a peripheral retaining ring 12 having a bead 12A for snap-coupling in a groove 50D (FIG. 7) in the lower end socket 50C of valve housing 50. Disposed within the ring 12 and secured thereto is a petaloid-shaped disc having a first frusto-conical portion 14 and a second frusto-conical portion 16 joined at a circular termination line 17 between the respective sections. Each section includes a plurality of evenly spaced and symmetrically disposed petaloid segments 14A and 16A, respectively, defining slots 20. Petaloid segments 16A are coupled to a petaloid stem 18 which is preferably cylindrical with a central bore therein. The region surrounding circular termination line 17 provides flexible knees or bends in each of the petaloid segments about which the segments may flex when the petaloid stem 18 is moved along the longitudinal axis of the spring assembly 10.

The frusto-conical sections of the petaloid-shaped disc 14,16, as illustrated in FIG. 5B, are shown in an extended or expanded state so that the slopes of the respective sections 14 and 16 are in substantially the same direction with respect to the longitudinal axis of the assembly. However, as will be illustrated in connection with the complete assembly of components in FIG. 7 the respective sections 14, 16 have opposite slopes when installed in the bore of valve housing 50 so that the spring is compressed to provide a biasing force against poppet 30.

Figure 6:
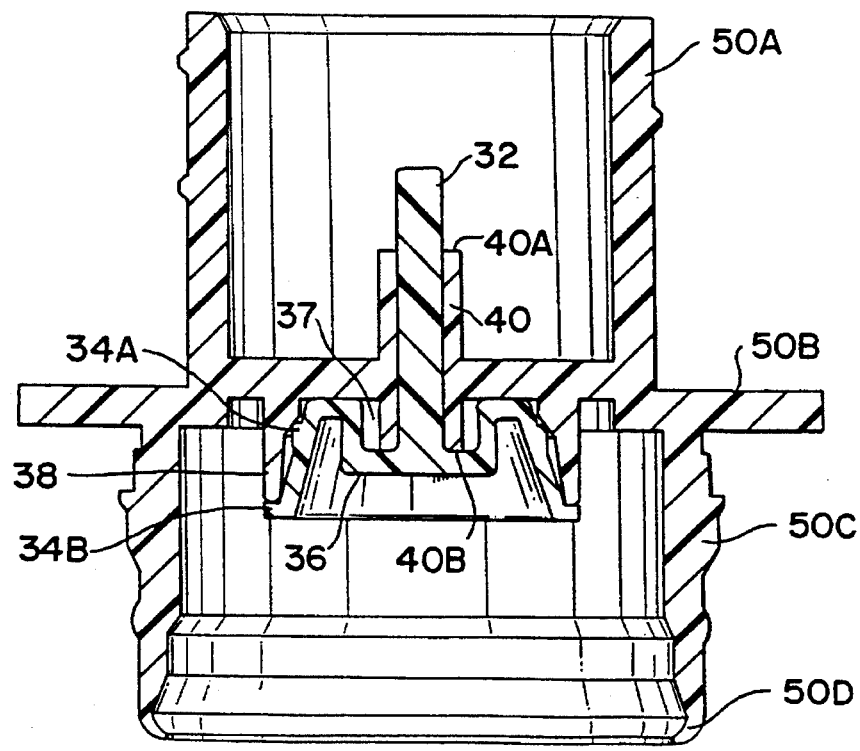
FIG. 6 is a cross-sectional view of the valve housing of FIG. 3A with the valve poppet of FIG. 4A disposed therein.

Referring to FIG. 6 there is illustrated in cross-section the valve poppet 30 with stem 32 thereof mounted for reciprocating movement within the bore of valve actuating stem 40. FIG. 6 also illustrates how the sealing shoulder 34A and peripheral flange 34B provide a seal with the surrounding valve seat 38, its tapered inner wall 38A and its bottom end 38B. FIG. 6 also illustrates how the bottom 40B of stem 40 fits within recess 37 of poppet 30 and acts as a stop for the top of base 35 of poppet 30.

Figure 7:
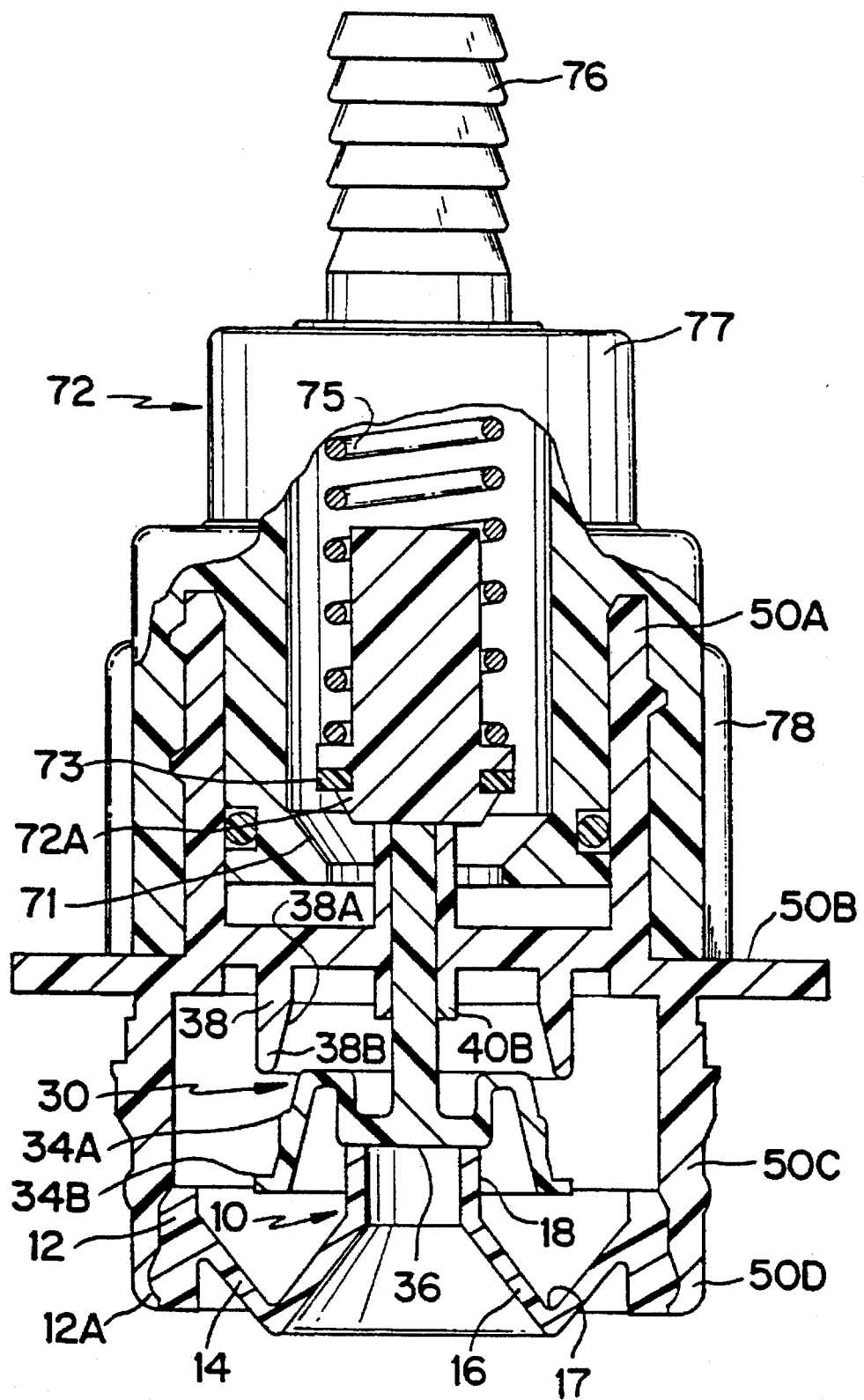
FIG. 7 is a cross-sectional view illustrating a fully engaged quick-disconnect coupling member and self-sealing valve of the present invention.

FIG. 7 illustrates the interconnection of quick-disconnect coupling 72, valve housing 50, poppet 30 and biasing spring 10. In the position illustrated in FIG. 7 all components are fully engaged, and both poppets 72A and 30 are disposed in their open positions to permit the free-flow of fluid through the central bore of valve housing 50, coupling 72 and fitting 76 to hose 70. It can be seen that, as coupling 72 is screwed onto the top end 50A of housing 50, poppet 72A presses against poppet stem 32 of poppet 30 and forces the base 35 thereof away from the valve seat assembly 38 to open the valve. Stationary valve actuating stem 40 supported by wall 41 presses against the bottom of valve poppet 72A against the force of coil springs 75 and unseats seal 71 in poppet 72A from the valve seat in the bottom of the housing 77 of connector 72.

The petaloid stem 18 of spring assembly 10 presses against the bottom 36 of base 35 of poppet 30 providing a biasing force normally closing poppet 30 and seating the base thereof within valve seat assembly 38. Bead 12A on ring 12 of spring assembly 10 snaps into channel or groove 50D on the inner surface of socket 50C thus securing spring assembly 10 in a fixed position about its periphery. Longitudinal movement of petaloid stem 18 will then cause flexing of the petaloid segments about the respective knees thereof defined in the regions of circular termination line 17.

In the position of spring assembly 10 illustrated in FIG. 7 the valve poppet 30 is open so the spring assembly 10 is in a compressed state. However, it should be noted as illustrated in FIG. 8 that even when the valve poppet is closed (the normal position) the respective frusto-conical sections 14,16 of the petaloid-shaped disc have oppositely directed slopes with respect to an axis substantially normal to the central axis of the petaloid-shaped disc.

FIG. 8 also illustrates slightly different shapes for the base 35 of valve poppet 30 and valve seat assembly 38. Valve seat assembly 38 includes a vertically oriented straight inner surface 38C and a tapered surface 38D at the bottom ends of the valve seat. The base 35 of poppet 30 includes a cooperating or mating surface 34C which sealingly engages against angled surface 38D. This sealing arrangement of the embodiment of FIG. 8 does not require as much spring force as the embodiment of FIGS. 6 and 7 since the base of the poppet does not have to move as far within the socket defined by valve seat assembly 38.

Figure 9:
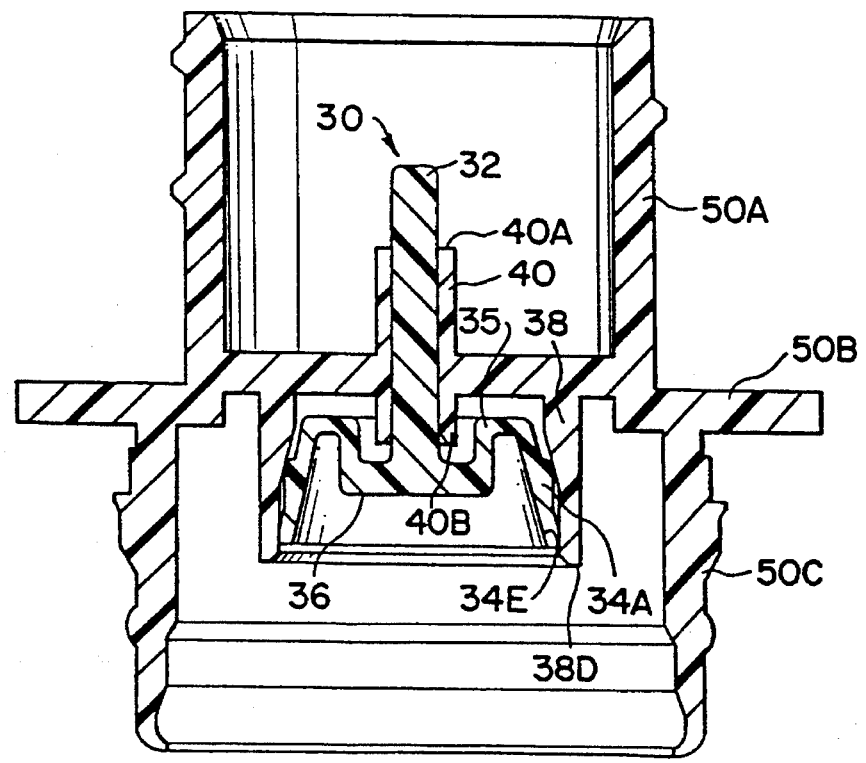
FIG. 9 is a cross-sectional view of still another embodiment of cooperating valve poppet and valve seat shape for the self-sealing valve of the present invention.

FIG. 9 illustrates still another sealing configuration associated with the base 35 of valve poppet 30 wherein the base includes a sealing shoulder 34A and a rounded end 34E instead of the flange 34B in the embodiment of FIG. 6. Again this is simply an alternative sealing arrangement for the valve poppet 30 within valve seat assembly 38 of the self-sealing valve of the present invention.

In preferred embodiments of the present invention the self-sealing bag valve 49 is fabricated totally from injection molded plastic parts such as polyethylene, polypropylene, PET or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A self-sealing bag valve comprising:
   a) a housing having first and second open ends connected by a central bore;
   b) a valve seat disposed within said central bore;
   c) a valve poppet movable into or out of sealing engagement with said valve seat to close or open the valve; and
   d) spring means for normally biasing said poppet into sealing engagement with said valve seat including,
      1. a petaloid-shaped disc having spaced petaloid segments defining flow passages therebetween,
      2. a retaining ring for securing peripheral portions of said disc in fixed positions in said bore, and
      3. a petaloid stem protruding from said disc into engagement with said valve poppet;
   whereby movement of said poppet causes flexing of said petaloid segments.

2. The valve of claim 1 wherein said petaloid-shaped disc includes a first frusto-conical portion extending from the retaining ring to a circular termination line concentric with the ring and a second frusto-conical portion extending from the circular termination line to the petaloid stem, said termination line providing a bendable joint forming knees in each petaloid segment for accommodating flexing of the elements about the knees.

3. The valve of claim 2 wherein said first and second frusto-conical portions, when said spring means is installed in said valve housing, having opposite slopes with respect to an axis normal to the petaloid-shaped disc.

4. The valve of claim 3 further including a groove in the central bore for accommodating a snap-fit of the retaining ring therein.

5. The valve of claim 1 further including a groove in the central bore for accommodating a snap-fit of the retaining ring therein.

6. The valve of claim 1 wherein said spring means is fabricated from plastic.

7. In a system for dispensing syrup from a container, said container including a fitment for defining an opening through which said syrup may flow, comprising:
   a) a first coupling member having first and second open ends connected by a central bore, said second open end being connected to said fitment;
   b) a first self-sealing valve disposed in said central bore including means in said bore defining a valve seat, a valve member movable into or out of sealing engagement with said valve seat, and a first actuating stem coupled to said valve member and extending toward said first open end of said first coupling member;
   c) spring means for normally biasing said valve member into sealing engagement with said valve seat including,
      1. a petaloid-shaped disc having spaced petaloid segments defining flow passages therebetween,
      2. a retaining ring for securing peripheral portions of said disc in fixed positions in said bore, and
      3. a petaloid stem protruding from said disc into engagement with said valve element,
   whereby movement of said poppet causes flexing of said petaloid segments;
   d) a second actuating stem rigidly affixed in said bore inboard of the walls thereof adjacent said first actuating stem and extending toward said first open end of said first coupling member, said second actuating stem being supported at the center of a plurality of spaced segments affixed to said bore walls, said radial segments defining fluid flow openings therebetween, said second actuating stem having a channel therethrough for guiding and supporting said first actuating stem; and
   e) a second coupling member for engaging said first open end of said first coupling member, said second coupling member including means for engaging said first actuating stem to move said valve member out of engagement with said valve seat when said first and second coupling members are fully engaged and a second self-sealing valve which is opened by said second actuating stem when said first and second couplings are fully engaged.

8. The system of claim 7 wherein said petaloid-shaped disc includes a first frusto-conical portion extending from the retaining ring to a circular termination line concentric with the ring and a second frusto-conical portion extending from the circular termination line to the petaloid stem, said termination line providing a bendable joint forming knees in each petaloid segment for accommodating flexing of the elements about the knees.

9. The system of claim .7 wherein said first and second frusto-conical portions, when said spring means is installed in said valve housing, having opposite slopes with respect to an axis normal to the petaloid-shaped disc.

10. The system of claim 9 further including a groove in the central bore for accommodating a snap-fit of the retaining ring therein.

11. The valve of claim 8 further including a groove in the central bore for accommodating a snap-fit of the retaining ring therein.

12. The system of claim 7 wherein the spring means of the first self-sealing valve is fabricated from plastic.

\* \* \* \* \*